United States Patent [19]

Watanabe et al.

[11] Patent Number: 4,872,033
[45] Date of Patent: Oct. 3, 1989

[54] IMAGE FORMING APPARATUS CAPABLE OF PROCESSING VARIOUS KINDS OF PHOTOSENSITIVE MATERIAL

[75] Inventors: Kazuo Watanabe; Toshiharu Nishimura; Masaki Kakutani, all of Hachioji, Japan

[73] Assignee: Konishiroku Photo Industry Co., Ltd., Tokyo, Japan

[21] Appl. No.: 317,078

[22] Filed: Feb. 28, 1989

Related U.S. Application Data

[63] Continuation of Ser. No. 78,838, Jul. 28, 1987, abandoned.

[30] Foreign Application Priority Data

Jul. 31, 1986 [JP] Japan ................................ 61-180928

[51] Int. Cl.$^4$ ........................ G03B 27/32; G03B 27/52
[52] U.S. Cl. .................................... 355/27; 354/322
[58] Field of Search ............... 354/319, 320, 321, 322; 355/27, 28

[56] References Cited

U.S. PATENT DOCUMENTS 3,699,869 10/1972 Jensen ................................. 354/321
4,486,082 12/1984 Wagner et al. ..................... 354/298
4,572,639 2/1986 Mackson ............................. 354/322

Primary Examiner—Monroe H. Hayes
Attorney, Agent, or Firm—Jordan B. Bierman

[57] ABSTRACT

Present invention provides an image forming apparatus capable of forming an image on various kinds of photosensitive material by subjecting the photosensitive material to an image forming process having at least imagewise exposing, developing, and fixing process on a process condition determined in accordance with a kind of the photosensitive material. While processing certain kind of photosensitive material, a kind discriminator detects a new kind of photosensitive material being subjected a current image forming process, CPU inhibits a new image forming process until judging a predetermined process of the current image forming process as being completed from a signal of a process monitor.

12 Claims, 9 Drawing Sheets

FIG. 8
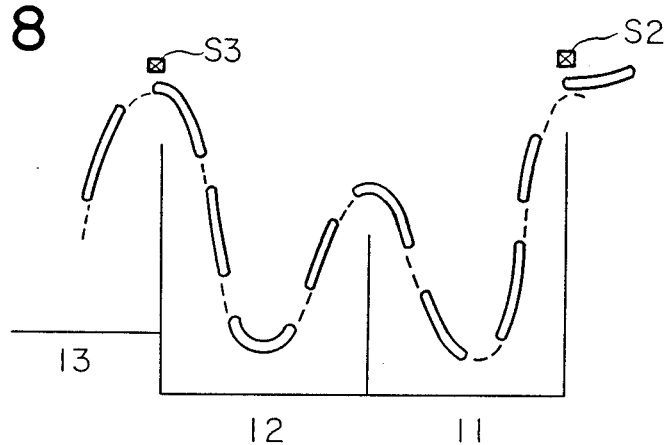
FIG. 9
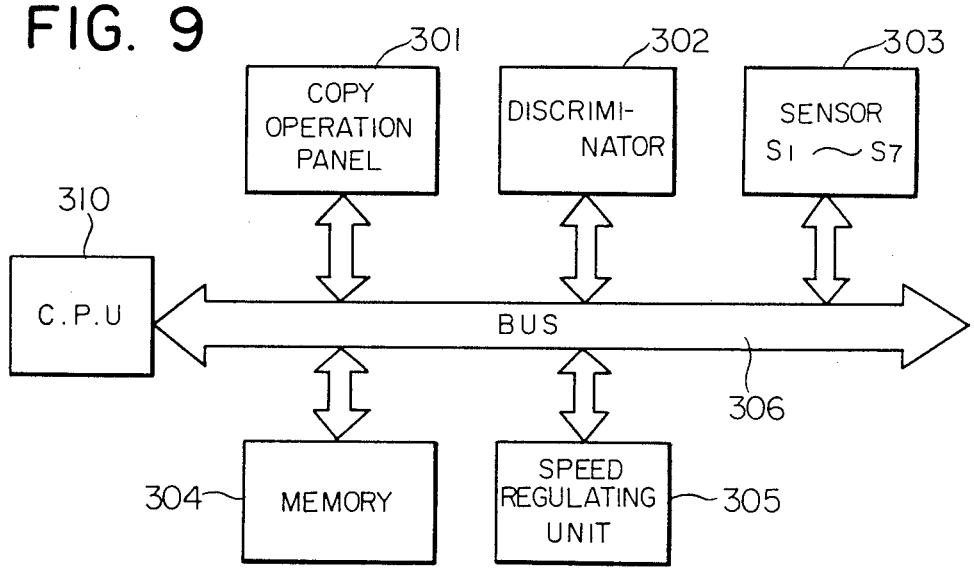
FIG. 10
| NO. | KIND | TIMER |
|-----|------|-------|
|     |      |       |
|     |      |       |
|     |      |       |
|     |      |       |
|     |      |       |
|     |      |       |
|     |      |       |
|     |      |       |
|     |      |       |

IMAGE FORMING APPARATUS CAPABLE OF PROCESSING VARIOUS KINDS OF PHOTOSENSITIVE MATERIAL

This application is a continuation of application Ser. No. 078,838, filed July 28, 1987 now abandoned.

FIELD OF THE INVENTION

The present invention relates to an image forming apparatus capable of recording an image on a photosensitive material. More specifically, the present invention relates to an image forming apparatus capable of using various kinds of photosensitive materials developed under different conditions.

As an image forming apparatus, a copying machine which uses ordinal paper is used for general use, wherein the original image is scanned using a light source and static-electrically transferred onto a transfer drum, the transferred image is developed using toner, and the developed image is transferred onto a print paper. A colored image also may be copied in color using the same principle. Color copying machines have already been manufactured and delivered in commercial base. The color copying quality obtained by this method, however, has not been so excellent.

Therefore, a color copying apparatus has been proposed, which can obtain images of superior copying quality by means of the following processes; a color photosensitive sheet is used for the recording sheet, the photosensitive sheet is directly scanned and exposed through the original image, and the image is developed and fixed by the same means used in the photographic process.

As examples of the various kinds of color photosensitive materials, the following two types are taken for easy explanation: one is a positive silver halide color photosensitve material (hereinafter, referred to as photographic paper), which is produced by providing a positive silver halide emulsion layer onto an opaque support; the other is a positive halide silver color photosensitive material (hereinafter, referred to as OHP film (OVERHEAD PROJECTION FILM)), which is produced by providing a positive silver halide color photosensitive layer onto a transparent support. The color copying method using silver halide photosensitive materials not only ensures excellent copying quality but also has the following advantages. The copying method can obtain excellent quality copies by the transparent type copying process, wherein images are formed on transparent films and looked using transmitting light, as well as by the reflection type copying process, wherein images are formed on white paper.

If one copying machine can produce both reflection- and transparent-type color copies, the machine is very convenient. Forming both reflection- and transparent type copies by one copying machine is popularly realized in electronic copying machines.

Since the toner forming the color image obtained by the electronicphotographic method is mainly composed of resign, the color image is inferior in light transmission ability. Thus, it is essentially difficult to obtain superior transmission image using the electronic photographic process.

In a copying machine using silver halide color photosensitive materials, it is supposed that one copying machine can obtain both reflection- and transparent-type color copies by designing the machine so that the machine can use both photosensitive materials whose supports are white paper and transparent film. However, the transparent color image has such problem that an OHP film having the dye density of the same level as a photographic paper produces a transparent color image having lower photographic density than that of the reflection type image. Thus, transparent color positive images are apt to have lower contrast, impressing to be soft gradation.

The silver halide photographic emulsion agents used for these photosensitive materials (photographic paper and OHP film) have no limitation. However, these photographic sheets are expected to be processed in the same processing solution. Therefore, it is preferable to use similar silver halide emulsion. It is the most preferable to use the same emulsion.

The photographic paper and OHP film have respective optimum gradation and image density. Moreover, sensitivities of photographic paper and OHP film vary based on the types of the support. Therefore, even when the same silver halide photographic emulsion agent is used, the conditions for exposing, developing, and uniform exposing processes should be changed based on the kind of the sheets to be processed; photographic paper or OHP film. The processing conditions may greatly differ when photosensitive materials of different kinds of silver halide emulsion agents are used.

In a copying machine using these kinds of photosensitive sheets, a rolled photosensitive sheet is set in a magazine, each required length of the sheet is cut and taken out from the magazine, and the sheet is subjected to the exposing and developing processes. Since the processes are the same as those for ordinal photographic paper as described above, these processes require significant duration. Therefore, to improve productivity, the copying machine is designed so that a plurality of photosensitive sheets can be immersed in the processing tank for development, fixation, etc. The photosensitive sheets, however, include photographic paper and OHP films, which require different processing conditions such as developing condition as described above. Therefore, a plurality of photosensitive sheets including photographic paper and OHP films cannot be processed at the same time.

That is, when an OHP film is exposed immediately after a photographic paper is exposed, and the processing conditions such as developing condition are altered at this point, to the conditions for processing the OPH film, the photographic paper that is under processed will be incompletely copied.

SUMMARY OF THE INVENTION

It is an object of the present invention to provide an image forming apparatus capable of processing various kinds of photosensitive sheets consecutively, wherein the above described problems can be eliminated.

To realize the above described object, an image forming apparatus according to the present invention is equipped with a means capable of detecting the kinds of photosensitive sheets and constructed so that kind alteration of photosensitive sheets can be detected by the detection signal transferred from the means and the following exposing operation start will be inhibited until the processing of the photosensitive sheets exposed before the kind alteration is completed.

BRIEF DESCRIPTION OF THE DRAWING

FIG. 6-1 to 6-3 are schematic cross sectional views of driving mechanisms of the high speed path, FIG. 7 and 8 are explanatory drawings for movements of photosensitive sheets on the low speed path, FIG. 9 is a schematic block diagram showing an outline of microcomputer, FIG. 10 is an explanatory drawing illustrating a timer table.

DETAILED DESCRIPTION OF THE INVENTION

Figure 1:
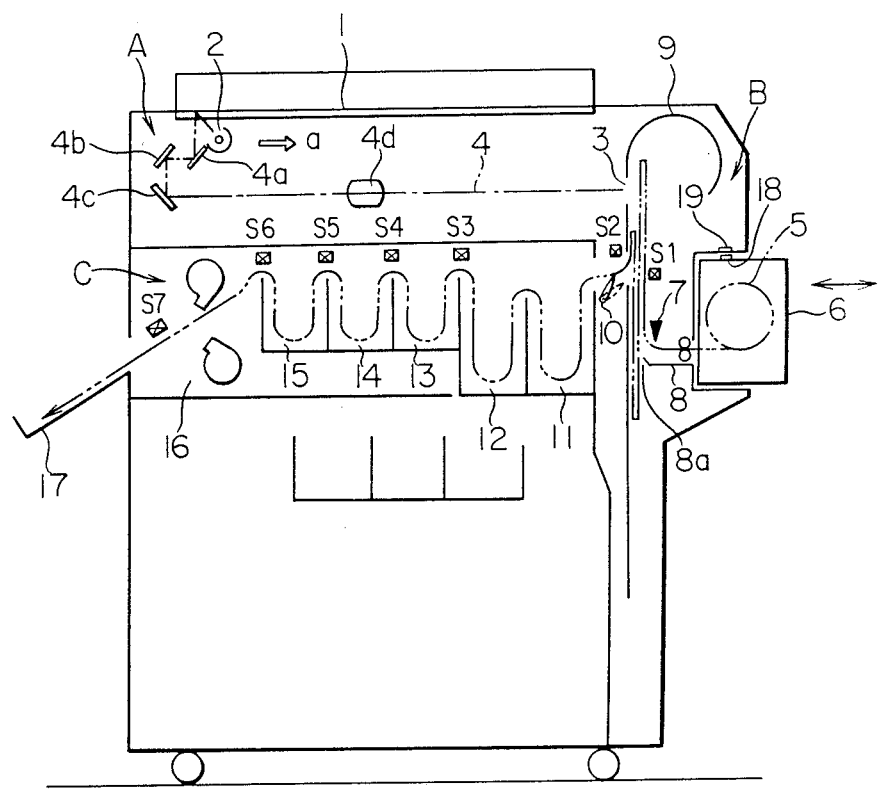
FIG. 1 is a schematic drawing showing a color copying apparatus according to an embodiment of the present invention.

An embodiment of the present invention will be described below. FIG. 1 is a schematic drawing showing an outline of a color copying apparatus according to an embodiment of the present invention. The color copying apparatus according to the embodiment comprises an exposing-scanning unit A, a color photosensitive sheet feed unit B, and a processing unit C.

The exposing-scanning unit A is constructed the same as that of an ordinal copying machine. In FIG. 1, 1 is a platen glass on which an original is placed; below the glass, a light source 2 is located, which exposes and scans the original in the direction shown by the arrow a; and an optical system 4 for exposing operation is provided so that an image on the original irradiated by the light source 2 is directed to an window 3 for exposing operation the image onto the color photosensitive sheet. The optical system 4 for exposing operation comprises a mirror 4a integrated to the light source 2, integrated mirrors 4b and 4c, which moves at a ½ velocity of the feed speed of the mirror 4a in the same direction, and a lens system 4d having a condenser lens, color filter for adjusting color, aperture mechanism, etc.

In the sheet feed unit B, a magazine 6 for storing a roll-wound color photosensitive sheet (photographic paper or OHP film, etc.) is detachably provided; the photosensitive sheet fed from the magazine is transferred to an upper storing guide 9 via the exposing window 3 by means of a guide unit 8 after being cut at a predetermined length by a cutter 7, and then exposed. A hole 8a for introducing the sheet downwardly, and a gate 10 for altering the advancing direction of the sheet are provided on the way of the guide unit 8.

In the processing unit C, color developing tanks 11 and 12, bleach-fix tank 13, and stabilization tanks 14 and 15 are sequentially located; following the stabilization tank 15, a dry room 16 using a fan and finally a receiver 17 are provided.

In FIG. 1, the light through the original exposed by the light source 2 advances as shown by the chain line and reaches the exposing window 3; the photosensitive sheet, cut at a predetermined length by the cutter 7 proceeds as shown by the two-dot chain line, is exposed at the exposing window 3, enters into the processing unit C via the gate 10, and is subjected to the processing operation.

The photosensitive sheet transfer path shown by the two-dot chain line is composed of a plurality of transfer rollers, not shown in the figure, which are driven by a driving unit comprising a driving motor, a clutch mechanism, a brake mechanism, and a speed control mechanism so that the photosensitive sheets are transferred at a predetermined speed.

In a preferable embodiment of the present invention, the light exposure of the photosensitive sheet, received from the exposing-scanning unit A, and the processing duration in the processing unit C are controlled by controlling the driving unit.

Therefore, the transfer path divided, at the gate 10 shown in FIG. 1, into the feed unit, or upper-stream side and the processing unit, or down-stream side, and constructed so that the transfer speed in the feed unit is high and the transfer speed in the processing unit is low. These transfer rollers at both sides are linked with the driving motor via the clutch mechanism.

The transfer speed in the high-transfer-speed path should be determined so that photosensitive sheets can receive a predetermined light exposure. The apparatus according to the embodiment is designed to permit a transfer speed from 100 mm/s to 300 mm/s.

The transfer speed in the low-transfer-speed path should be determined so that photosensitive sheets can be processed during a predetermined duration in the color developing tanks 11 and 12, the bleach-fix tank 13, and the stabilization tanks 14 and 15, respectively. The apparatus according to the embodiment is designed to permit a transfer speed from 4 mm/s to 7 mm/s.

The operation speeds in the low- and high-transfer-speed paths are controlled within the above described ranges based on the kind of photosensitive sheets detected by the detection means described below. A driving motor may be installed for the high or low-transfer-speed path independently, or one driving motor may be commonly used for both paths by linking a respective speed reduction mechanism.

In FIG. 1, symbols S1 to 7 express sheet sensors attached along the transfer path as shown in the figure. The transferring conditions of photosensitive sheets can be clearly determined by mounting these sheet sensors.

The times when a photosensitive sheet should pass through each sensor can be calculated using the distances between each sensor and transferring speed in advance. If a specific sensor cannot detect a photosensitive sheet even though the calculated time has already passed, it is determined that some problems such as jamming has occurred on the upper-stream path.

After being exposed by the exposing-scanning unit A, photosensitive sheets are transferred from the high-transfer-speed path to the low-transfer-speed path at the gate 10 and proceed into the processing unit. As shown in FIG. 1, a sheet sensor S2 located at the down-stream side of the gate 10 monitors photosensitive sheets being transferred from the high-transfer-speed path to the low-transfer-speed path. To improve processing efficiency of the apparatus according to the present invention, the sensor S2 monitors that photosensitive sheets already exposed are transferred into the processing unit, thereby enabling to start exposing-scanning operation at any time after the sensor S2 detects that a photosensitive sheet has already transferred into the processing unit. Therefore, in an apparatus according to the present invention, a plurality of photosensitive sheets already exposed are consecutively transferred into the processing unit, that is, in the low-transfer-speed path, thus shortening interval between each copying operation. Therefore, it is assumed that the processing unit should process various kinds of photosensitive sheets, or photographic paper and OHP films, and various types of silver halide emulsion agents consecutively. At this time, the color developing conditions should be changed based on the kinds of the photosensitive sheets. For instance, when OHP films and photosensitive paper having the same kind of emulsion are processed, a high density and high gradation image can be obtained by setting a processing time for the OHP films longer than that for photographic paper.

Therefore, in this embodiment, a discrimination mark 18 such as a magnet for discriminating whether the stored photosensitive sheet is, for instance, photographic paper or OHP film is attached onto the magazine as shown in FIG. 1, and a sheet discriminator 19 such as a reed switch for determining the mark 18 is provided onto the copying apparatus main body to which the magazine is installed.

Figure 2:
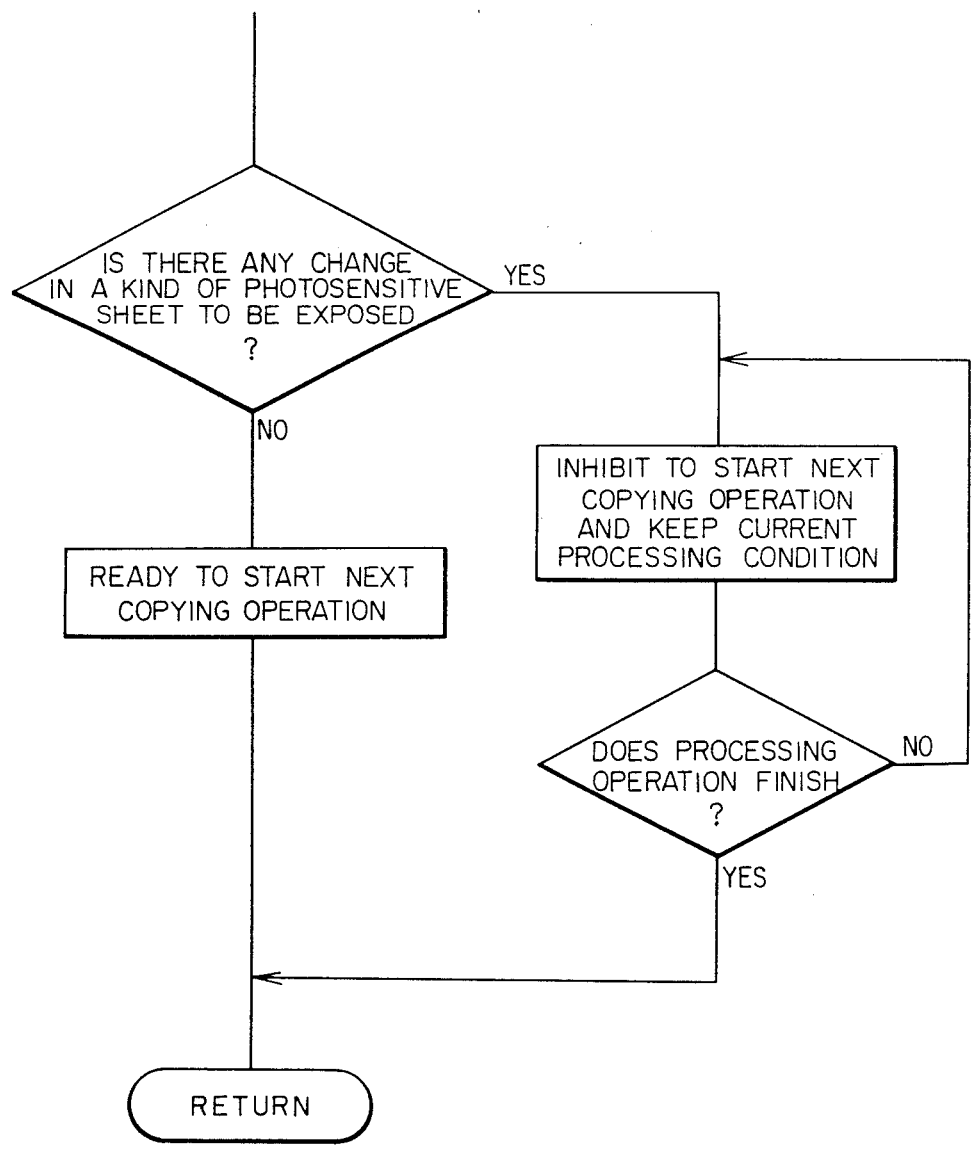
FIG. 2 is a process flow chart.

As shown in the flow chart of FIG. 2, if the kind alteration of photosensitive sheets is detected by the sheet discriminator 19 at the time of replacing the magazine 6, starting the next copying operation is inhibited (sending a READY signal is inhibited), and a READY signal will be sent only when the processing for the photosensitive sheets currently treated in the processing unit C is completed, thus enabling the normal copying operation.

At the time when the apparatus is ready to start the next copying operation, the processing conditions selected by the sheet detection signal from the sheet discriminator 19 for the current kind of photosensitive sheets are automatically set, and the following photosensitive sheets will be processed under the set conditions when the next copying operation starts.

If the sheet discriminator 19 outputs the same signal as the previous one even when the magazine 6 is replaced, that is no change in photosensitive sheets is detected, the next copying operation is allowed to start, and processing under the same conditions is continued. That is, when kind alteration of photosensitive sheets is not detected by the sheet discriminator 19 in FIG. 2, the program flow proceeds to "RETURN" after detecting the signal from the sensor S2 informing of the transfer completion of photosensitive sheet, thereby the apparatus is ready to start the next copying operation described above.

On the contrary, when kind alteration of photosensitive sheets is detected by the sheet discriminator 19, the signal from the sensor S2 informing of the transfer completion of photosensitive sheet is ignored, and starting the next copying operation is inhibited by determining that the processing operation in the processing unit is not completed until a signal is issued from, for instance, the sensor S6 provided on the down-stream side of the stabilization tank 15 informing that the processing operation of all photosensitive sheets being processed in the processing unit has already been completed and all of the photosensitive sheets are transferred into the drying chamber 16. By detecting a completion signal sent from the sensor S6, the program flow proceeds to "RETURN", thus causing the apparatus to be ready to start the next copying operation. To facilitate easy understanding of the concept of the present invention, the signal informing of the processing operation completion is detected by the sensor S6 provided at the down-stream side of the stabilization tank, or the last tank, in the above description. However, the configuration of the present invention is not limited by the above, for instance, the signal may be detected by the last sensor S7.

The inventors have enthusiastically studied to obtain high-density and high-gradation images by changing the processing duration based on the kinds of photosensitive sheets and to improve the processing efficiency by shortening the processing duration. As a result, we have found that the above described objectives can be satisfactorily attained, from the view point of practical use, by detecting the processing operation completion signal using the sensor S3. That is, the image characteristics obtained from the photosensitive sheet already exposed are basically depend on the processing conditions in the color developing tanks. Therefore, if kind alteration of photosensitive sheets is detected, the low-transfer-speed path may be operated at the current speed based on the requirements of the currently processed photosensitive sheets by determining that the processing operation has not yet completed until the photosensitive sheets currently processed in the color developing tank pass through the color developing tank and are transferred into the bleach-fix tank. After the current processing operation in the color developing tank is complete, the program flow proceeds to "RETURN" by receiving the processing operation completion signal issued from the sensor S3, thereby enabling the next copying operation under the processing conditions selected for the new kind of photosensitive sheets. The new photosensitive sheets exposed under the new exposing conditions proceed the low-transfer-speed path at a operation speed selected based on the kind of photosensitive sheets and are processed in the color developing tanks. At this time, the photosensitive sheets that previously passed through the sensor S3 and has already been processed in the color developing tanks will pass through the fixation tank and stabilization tank and be processed in the tanks at the operation speed selected based on the new kind of photosensitive sheets. As clearly understood, altering the sensor issuing the process completion signal from the sensor S7 to the sensor S3 allows the apparatus to start the next copying operation without waiting for the photosensitive sheets currently processed to pass through the bleach-fix tank, stabilization tank, and drying chamber, thus increasing the processing efficiency.

In the above described embodiment, sensors are installed in order to detect photosensitive sheets as shown in FIG. 1. However, the present invention is not limited this configuration. That is, since the time required for a photosensitive sheet to be transferred to the position on which the sensor is located can be calculated, a count-up signal of a timer may be used as a signal informing of the process completion by entering the required time calculated above in advance.

EMBODIMENT OF PROCESSING

The embodiments of the present invention will be explained below.

The silver halide photosensitive materials used in this embodiment are the internal latent image type of multi-layer color photosensitive materials produced by the method described below.

Onto surface-treated polyethylene laminated paper or surface-treated polyethylene telephthalate films, nine layers from the red-sensitive emulsion layer (described below) to protective layer are simultaneously applied and dried. The formed of the produced photosensitive sheets is abbreviated as photographic paper and the latter is as OHP films.

Red-sensitive Emulsion Layer (First Layer)

An inactive gelatine solution of 2.0% was maintained at 50° C. and the A and B solutions shown below were simultaneously poured into the solution over a period of three minutes while stirring the gelatine solution. Ten minutes after, the C solution was poured and added in the solution over a period of three minutes. After ripening the solution for 40 minutes, excess salt was removed by water-rinsing precipitate. The D and E solutions were added into the emulsion to laminate, onto the core surface, silver chloro-bromide consisting of 95 mol % AgCl and 5 mol % AgBr. Excess soluble salt were removed again by water-rinsing precipitate. Gelatine was added to disperse the precipitate.

| A solution | Pure water | 500 ml | |
| --- | --- | --- | --- |
| | NaCl | 40 g | (137 mol %) |
| | KBr | 8.9 g | (15 mol %) |
| | KI | 0.4 g | (0.5 mol %) |
| B solution | Pure water | 600 ml | |
| | AgNO$_3$ | 85 g | |
| C solution | Pure water | 300 ml | |
| | KBr | 50.6 g | (85 mol %) |
| D solution | Pure water | 1500 ml | |
| | NaCl | 20 g | (114 mol %) |
| | KBr | 1.8 g | (5 mol %) |
| E solution | Pure water | 500 ml | |
| | AgNO$_3$ | 51 g | (0.3 mol %) |

After this step, the following agents were added into the silver halide emulsion by appropriate quantities: sensitization dye or spectral sensitizer [D-1]; sensitization dye [D-2]; solution containing 2,5-dioctylhydroquinone protectively dispersed with dibutyl phthalate and cyan coupler [C, C-1]; 4-hydroxy-6-methyl-1,3,3a,7-tetrazaindene; 1-phenyl-5-mercaptotetrazole; gelatine; and coating aid [S-1]. Finally, the emulsion was applied onto the support so that the quantity of silver applied was 0.4 g/m$^2$.

First Intermediate Layer (Second Layer)

A gelatine solution containing 2,5-dioctylhydroquinone dispersed in dioctylphthalate, TINUVIN 328 (ultra violet radiation absorbing agent produced by CIBA GEIGY AG), and coating aid [S-1] was prepared and applied onto the support so that the quantity of TINUVIN 328 applied was 0.15 g/m$^2$.

Green-sensitive Emulsion Layer (Third Layer)

Silver halide emulsion was prepared using the same manner as the red-sensitive emulsion. The following agents were added into the silver halide emulsion by appropriate quantities: sensitization dye [D-2]; solution containing 2,5-dioctylhydroquinone protectively dispersed with dibutylphthalate and magenta coupler [MC-1]; 4-hydroxy-6-methyl-1,3,3a,7-tetrazaindene; 1-phenyl-5-mercaptotetrazole; gelatine; and coating aid [S-2]. Finally, the emulsion was applied onto the support so that the quantity of silver applied was 0.4 g/m$^2$.

Second Intermediate Layer (Fourth Layer)

Using the same manner as the first intermediate layer, TINUVIN 328 was applied by 0.2 g/m$^2$.

Yellow Filter Layer (Fifth Layer)

Into a solution containing yellow colloidal silver produced by reducing silver nitrate under the presence of alkaline weak reducing agent (the reducing agent was removed by the Noodle rinsing method carried out after neutralization process) and 2,5-dioctylhydroquinone solution protectively dispersed in dibutylphthalate, coating aid [S-2], and hardening agent [H-1] (added immediately before the application process) were added, mixed, and applied onto the support so that the quantity of silver applied was 0.15 g/m$^2$.

Third Intermediate Layer (Sixth Layer)

Using the same manner as the first intermediate layer, TINUVIN 328 was applied by 0.15 g/m$^2$.

Blue-sensitive Emulsion Layer (Seventh Layer)

An inactive gelatine solution of 1.5% was maintained at 60° C. and the A and B solutions shown below were simultaneously poured into the solution over a period of 15 minutes while stirring the gelatine solution. Fifteen minutes after, the C solution was poured over a period of two minutes. One minute after, hypo was added by a quantity equivalent to 3 mg/Ag, and the solution was ripened for 40 minutes. Sample analysis revealed that the mixture was silver chloro-iodo-bromide consisting of AgCl; 4 mol %, AgBr; 96 mol %, and AgI; 2 mol %.

After removing excess salt by water-rinsing precipitate, the D and E solutions shown below were added into the emulsion to laminate, onto the core surface, silver chloro-bromide consisting of 97 mol AgCl and 3 mol % AgBr. Excess soluble salt was removed again by water-rinsing precipitate. Gelatine was added to disperse precipitate.

| A solution | Pure water | 1000 ml |
| --- | --- | --- |
| | NaCl | 76 g |
| | KBr | 17 g |
| | Hexachloroiridium (III) salt | 2 × 10$^{-5}$ g |
| B solution | Pure water | 1000 ml |
| | AgNO$_3$ | 169.9 g |
| C solution | Pure water | 800 ml |
| | KBr | 103 g |
| | KI | 3.3 g |
| D solution | Pure water | 500 ml |
| | AgNO$_3$ | 51 g |
| E solution | Pure water | 500 ml |
| | NaCl | 25.8 g |
| | KBr | 1.1 g |

After this step, the following agents were added into the silver halide emulsion by appropriate quantities: sensitization dye [D-3]; solution containing yellow coupler [YC-1] dispersed into dioctylphthalate; 2-mercaptobenzothiazole; 4-hydroxy-6-methyl-1,3,3a,7-tetrazaindene; gelatine; coating aid [S-3]; and hardening agent [H-2] (added immediately before the application process). Finally, the emulsion was applied onto the support so that the quantity of silver applied was 0.5 g/m$^2$.

Fourth Intermediate Layer (Eighth Layer)

Using the same manner as the first intermediate layer, TINUVIN 328 was applied by 0.3 g/m$^2$. Into this layer, however, hardening agent was added.

Protective Layer (Ninth Layer)

The gelatine solution containing colloidal silica, coating aid [S-3], hardening agent [H-2] and [H-3] (added immediately before the application process) was applied onto the support so that the quantity of gelatine applied was 1.0 g/m².

Cyan Coupler [CC-1]

Cyan coupler [CC-1]

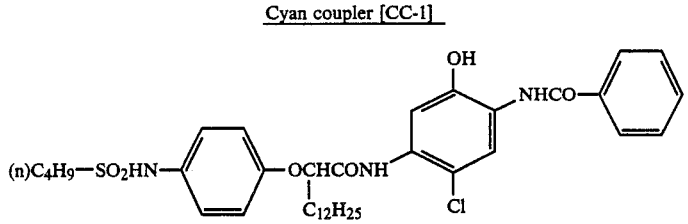

Magenta coupler [MC-1]

Magenta coupler [MC-1]

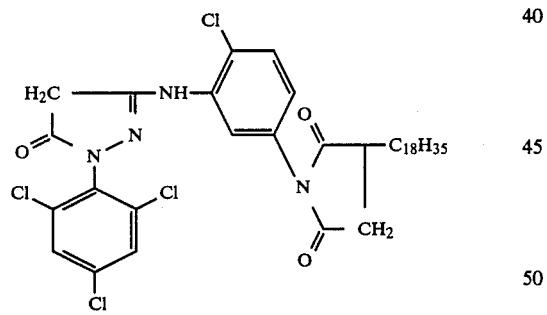

Yellow Coupler [YC-1]

Yellow coupler [YC-1]

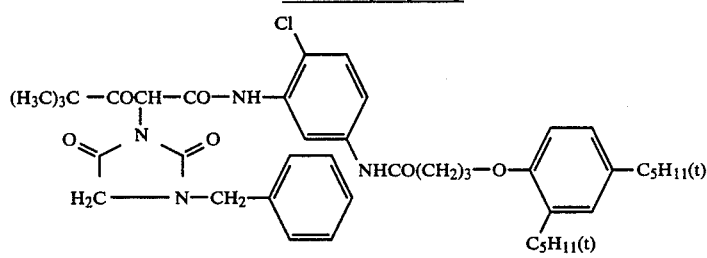

Sensitization Dye [D-1]

Sensitization dye [D-1]

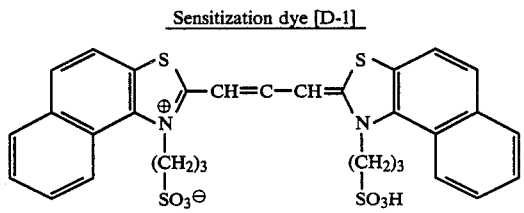

Sensitization Dye [D-2]

Sensitization dye [D-2]

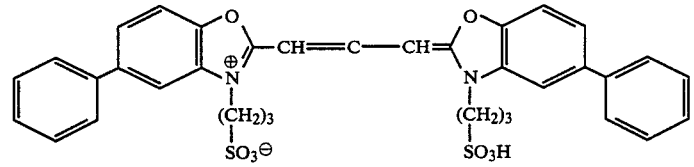

Sensitization Dye [D-3]

Sensitization dye [D-3]

Sensitization Dye [D-4]

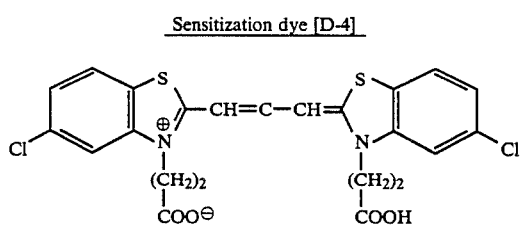

Coating Aid [S-1]

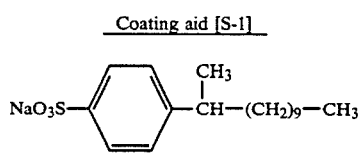

Coating Aid [S-2]

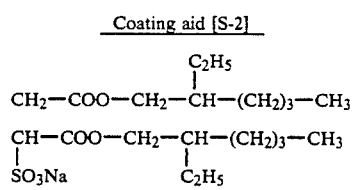

Coating Aid [S-3]

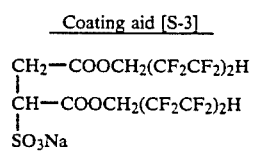

Hardening Agent [H-1]

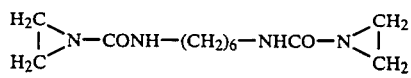

Hardening Agent [H-2]

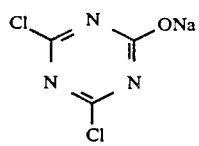

Hardening Agent [H-3]

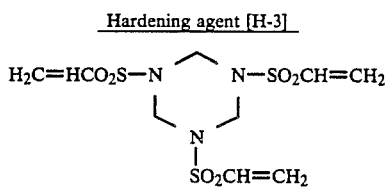

The processing conditions for respective photosensitive sheets used in this embodiment are listed below:
Process (processing temperature and processing time)

|  | | Photographic paper | OHP film |
|---|---|---|---|
| [1] Dipping (color developer) | 38° C. | 8 sec. | 9.6 sec. |
| [2] Uniform exposing (at one lux) | | 10 sec. | 12 sec. |
| [3] Color developing | 38° C. | 120 sec. | 144 sec. |
| [4] Bleach-fixing | 35° C. | 60 sec. | 72 sec. |
| [5] Stabilizing | 25 to 30° C. | 90 sec. | 108 sec. |
| [6] Drying | 75 to 80° C. | 60 sec. | 72 sec. |

| Compositions of processing solution | |
|---|---|
| (Color developer) | |
| Benzyl alcohol | 10 ml |
| Ethylene glycol | 15 ml |
| Potassuim sulfite | 2.0 g |
| Potassium bromide | 1.5 g |
| Sodium chloride | 0.2 g |
| Potassium carbonate | 30.0 g |
| Hydroxylamine sulfate | 3.0 g |
| Polyphosphoric acid (TPPS) | 2.5 g |
| 3-Methyl-4-amino-N—ethyl-N—($\beta$-methanesulfonate-amidoethyl)aniline sulfate | 5.5 g |
| Fluorescent whiting agent (4,4'-diaminostyl-benzosulfonic acid derivative) | 1.0 g |
| Potassium hydroxide | 2.0 g |

Pure water was added to the mixture of the above agents until a total quantity of 1 liter was obtained, and the solution was adjusted to pH 10.20.

(Bleach-fix Solution)

Ammonium ferric ethylene diaminetetracetate dihydride

| Ammonium ferric ethylenediaminetetracetate dihydride | |
|---|---|
| | 60 g |
| Ethylenediaminetetracetate | 3 g |
| Ammonium tiosulfate (70% solution) | 100 ml |
| Ammonium sulfite (40% solution) | 27.5 ml |

Potassium carbonate or glacial acetic acid used to adjust the mixture of the above agents to pH 7.1, and pure water was added until a total quantity of 1 liter was obtained.

| 5-Chloro-2-methyl-4-isothiazoline-3-on | 1.0 g |
|---|---|
| Ethylene glycol | 10 g |
| 1-Hydroxyethylidene-1,1'-diphosphonic acid | 2.5 g |
| Bismuth chloride | 0.2 g |
| Magnesuim chloride | 0.1 g |
| Ammonium hydroxide (28% solution) | 2.0 g |

Pure water was added to the mixture of the above agents until a total quantity of 1 liter was obtained, and ammonium hydroxide or sulfuric acid was used to adjust the solution to pH 7.0. The stabilization process was carried out by the counterflow method consisting of two tanks.

Images having optimum gradation and density were obtained by this embodiment, wherein an identification mark was attached onto the magazine in which photosensitive sheets were stored, the identification mark was detected by a detection means, and the optimum processing conditions were selected based on the detected kind of the photosensitive sheets. For instance, when a magazine storing OHP films was attached while photographic paper was being processed, the next copying operation was inhibited until the sensor S3 installed at the down-stream side of the color developing tank would issue a completion signal, thus maintaining the transfer speed optimum to the photographic paper currently being processed and ensuring the color developing time of 138 sec. (including time for dipping and uniform exposing) for the photographic paper. When the sensor S3 detected that the photographic paper passed through the sensor and issues a signal informing of the completion of the processing, the next copying operation would be enabled and processing conditions optimum for the OHP films would be selected. By this step, the processing time required for bleach-fixing, stabilizing, and drying the photographic paper was longer than the usual time, however, the quality of the images were the same level as that obtained by the usual processing. On the contrary, when a magazine storing photographic paper was attached while OHP films were being processed, the processing conditions for OHP films were maintained until the OHP films passed through the sensor S3, thereby ensuring the color developing time for OHP films at 165 sec. After the sensor S3 detected that the OHP films passed through the sensor and issued a signal informing the processing completion, the processing conditions optimum for the photographic paper were selected and set. By this step, the processing time required for bleach-fixing, stabilizing, and drying the OHP films was shorter than the usual time, however, the quality of the images the same level as that obtained by the usual processing were obtained by ensuring enough reaction speed in the fixer.

As clearly understood by the above description, the apparatus according to the present invention ensures processing conditions optimum for new photosensitive sheets without any problems when altering the kind of the photosensitive sheets.

EMBODIMENTS OF APPARATUS

In the above described embodiments, the next copying operation is inhibited until the color developing processing of the photosensitive sheets being processed before the kind of photosensitive sheets is altered has been completed. The important point of the present invention is that the conditions of color developing process are changed based on the kind of the photosensitive sheets. In order to realize this point, it may be considered to select the color developing tanks based on the kind of photosensitive sheets to be processed. However, this idea is not preferable because the apparatus may become too large in size.

In order to realize the above point using the same color developing tanks, it may be inhibited to process the different kinds of photosensitive sheets in the tank at the same time, and the processing speed in the color developing tank may be changed based on the kind of the photosensitive sheets to be processed.

Regarding the exposing operation, the process requires a certain period of processing time although the operation is carried out in the high-transfer-speed path. Therefore, even if a signal, informing of operation completion, is issued prior to the period of time required for the exposing process, and the next exposing operation should be carried out, it is possible, by the following configuration, to prevent different kinds of photosensitive sheets from being processed in the color developing tank at the same time: the exposing operation inhibit circuit is designed so that the circuit is canceled prior to the period of time required for exposing the next photosensitive sheet before the color developing process of the photosensitive sheet exposed previously is completed. When the exposing operation of the next photosensitive sheet is started, the high-transfer-speed path is controlled at a speed selected based on the kind of photosensitive sheet to be processed. During this exposing operation, the low-transfer-speed path is controlled at a speed selected based on the kind of photosensitive sheet before the alteration, and terminates the color developing process of the current photosensitive sheet. When the photosensitive sheet before the alteration passes through the color developing tank, and the next photosensitive sheet is exposed and transferred into the low-transfer-speed path, the sensor S2 detects the photosensitive sheet, thereby the speed of the low-transfer-speed path is selected and controlled based on the kind of the photosensitive sheet after the alteration. The above configuration can further improve the processing efficiency.

Figure 3:
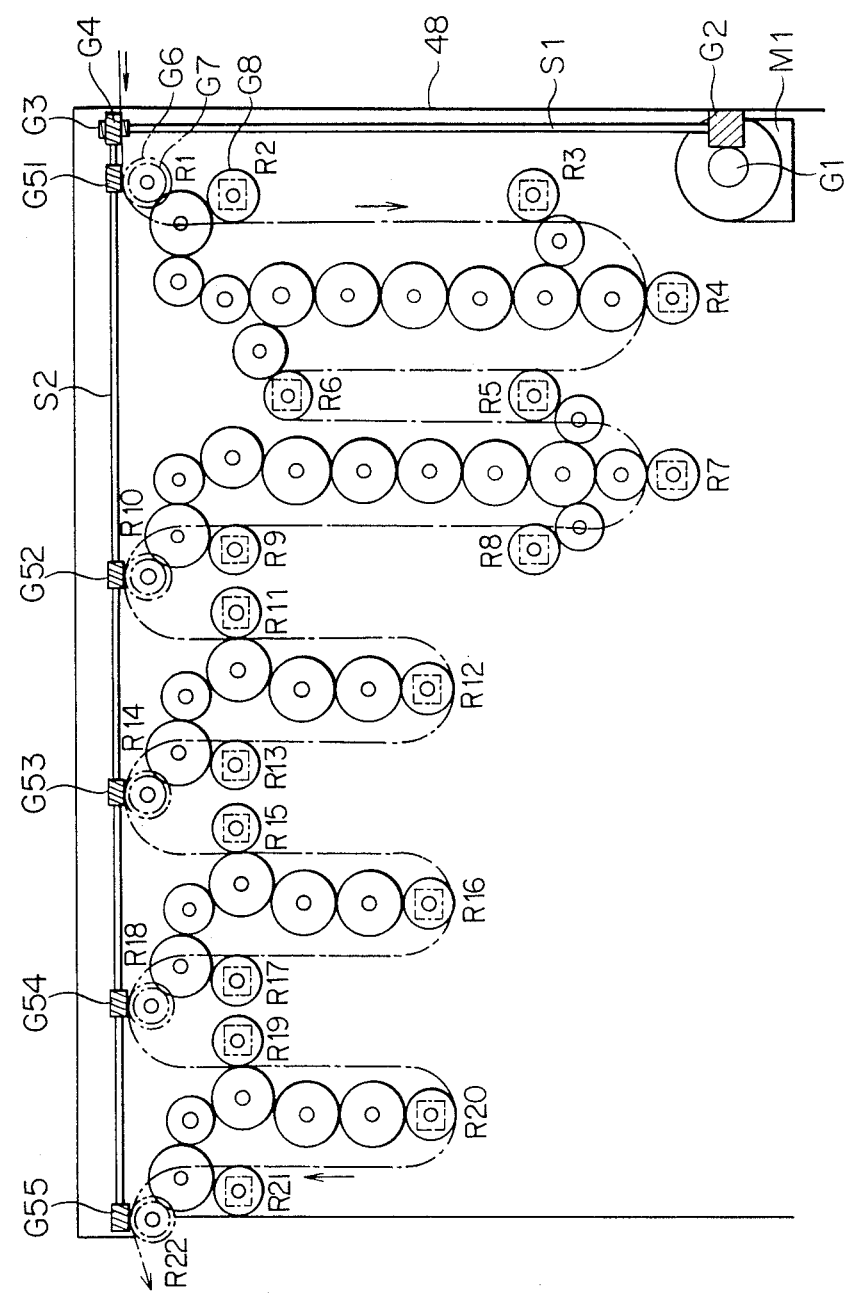
FIG. 3 is a schematic cross sectional view of a low speed path of the apparatus as shown in FIG. 1.

One embodiment of the high- and low-transfer-speed paths shown in FIG. 1 will be explained, wherein the high- and low-transfer-speed paths have a respective driving motor. FIG. 3 shows the low-transfer-speed path serving as the processing unit C shown in FIG. 1. The chain line in FIG. 3 shows the low-transfer-speed path. A worm G1 secured to the driving shaft of a driving motor M1 (for instance, AC variable motor) of the low-transfer-speed path rotates a worm wheel G2 secured to an intermediate shaft S1. At the other end of the intermediate shaft S1, a helical gear G3 is secured and rotates a helical gear G4 secured at one end of a connection shaft S2, thereby worm gears G51, G52, G53, G54, and G55 are rotated. The worm gear G51 rotates each shaft of driving rollers R1, R2, R3, R4, and R6 in a developing tank 12 by means of the shown gear series. The worm gear G52 rotates each shaft of driving rollers R10, R9, R8, R7, and R5 in the developing tank 12 by means of the shown gear series. The worm gear G53 rotates each shaft of driving rollers R14, R13, R12, and R11 in the bleach-fix tank 13 by means of the shown gear series. The worm gear G54 rotates each shaft of driving rollers R18, R17, R16, and R15 in the stabilizing tank 14 by means of the shown gear series. The worm gear G55 rotates each shaft of driving rollers R22, R21, R20, and R19 in the stabilizing tank 15 by means of the shown gear series. In the configuration shown in FIG. 3, the processing speed in the low-transfer-speed path can be controlled based on the kind of photosensitive sheets to be color-developed by controlling the driving motor for the low-transfer-speed path. For instance, the processing speed is controlled at 7.0 mm/s for photographic paper, and at 5.8 mm/s for OHP films in the embodiment described above.

Figure 4:
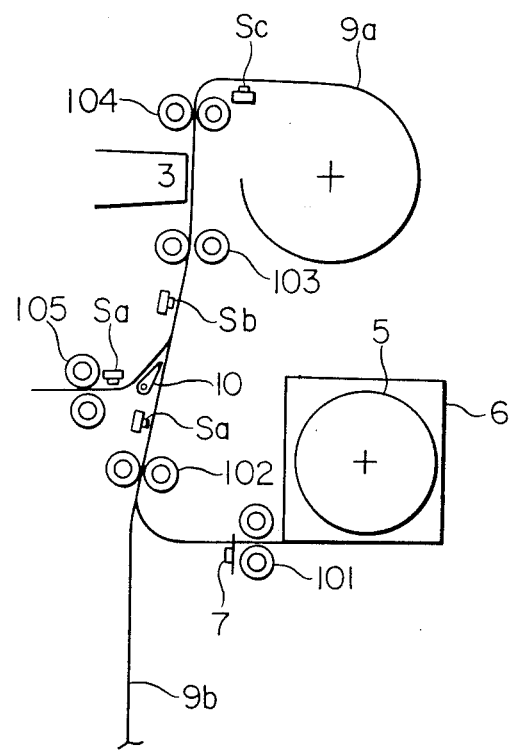
FIG. 4 is a schematic cross sectional view of a high speed path of the apparatus as shown in FIG. 1, FIG. 5-1 to 5-5 are explanatory drawings for operating conditions of the high speed path.
Figures 1, 5:
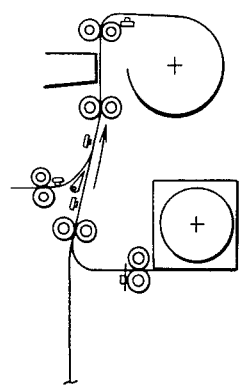
Figures 2, 5:
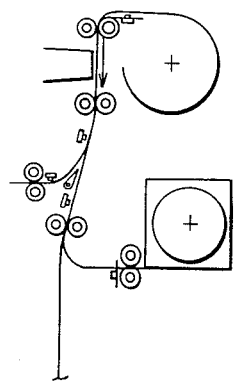
Figures 3, 5:
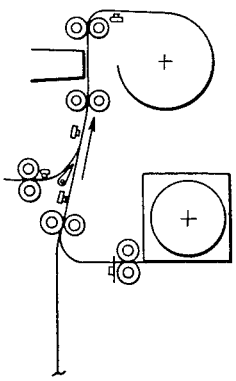
Figures 4, 5:
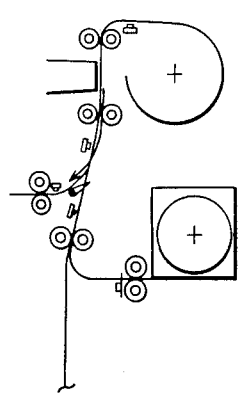
Figure 5:
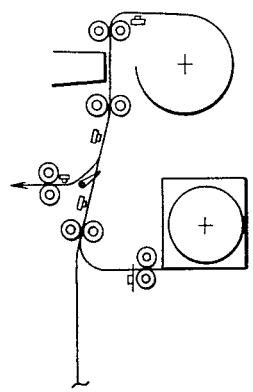
Figures 1, 6:
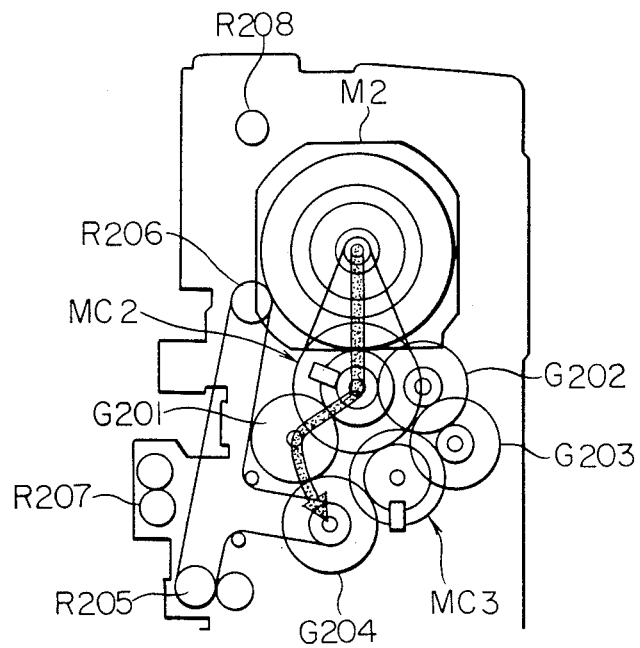
Figures 2, 6:
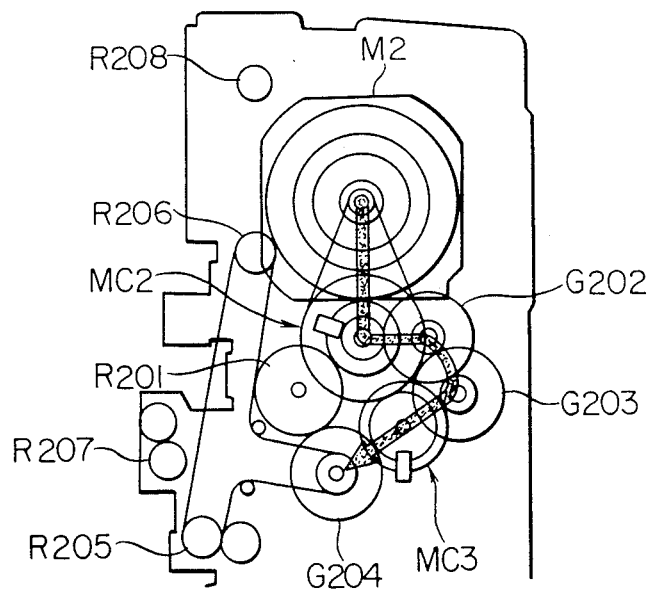
Figures 3, 6:
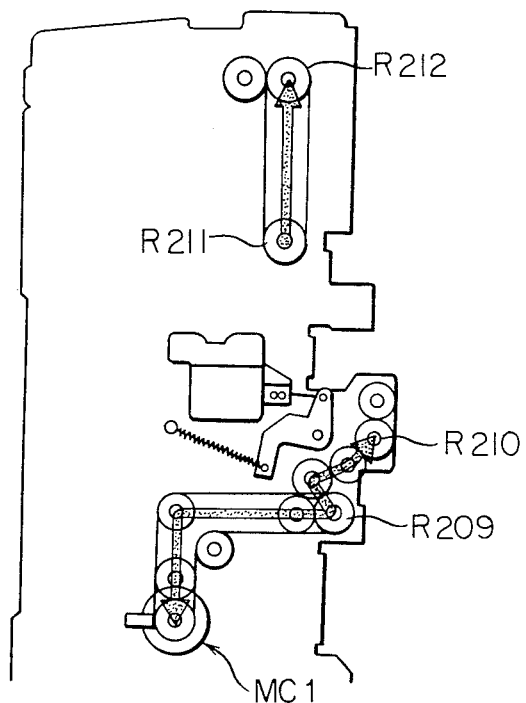

Next, FIG. 4 shows the high-transfer-speed path serving as the feeding unit B of photosensitive sheets shown in FIG. 1. Its driving unit is shown in FIG. 6. In FIG. 4, the same parts as shown in FIG. 1 are designated as the identical numbers. In FIG. 4, 6 is a magazine storing photosensitive sheets;

101 to 105 are feed rollers comprising a pair of rollers, in which these paired rollers are arranged on both sides of the high-transfer-speed path illustrated by the solid line;

7 is a cutting means for cutting rolled photosensitive sheet at a predetermined length;

9a located the upstream side of the high-transfer-speed path is an upper storing guide;

9b located at the downstream side of the high-transfer-speed path is a lower storing guide;

the sensor S1 mounted at the feed unit shown in FIG. 1 comprises Sa, Sb, and Sc as shown in FIG. 4;

3 is an exposing unit for exposing photosensitive sheets; and 10 is a guide means for transferring the exposed photosensitive sheets into the low-transfer-speed path. The operation in the feed unit will be described referring to FIGS. 5-1 to 5-5. In FIG. 5-1, after setting copying conditions such as the copying size, pressing the START button causes the photosensitive sheet to be transferred by driving the transfer roller. The top edge of the rolled photosensitive sheet proceeds as shown by the arrow. The sensor Sa detects the quantity of the sheet fed, and the cutter 7 cuts the sheet when a predetermined length of the sheet is detected. The cut sheet is wound inside the upper storing guide 9. When the sensor Sc detects that a predetermined length of the photosensitive sheet is wound, the exposing operation starts as shown in FIG. 5-2. The exposed photosensitive sheet proceeds along the lower storing guide. The movement quantity of the photosensitive sheet during this operation is monitored by the sensor Sb. When the exposing operation is completed, the photosensitive sheet proceeding inside the lower storing guide is rewound into the upper storing guide as shown in FIG. 5-3. After this step, a part of the guide unit 10 operates to start transferring the photosensitive sheet into the low-transfer-speed path as shown in FIG. 5-4.

Further, the transferring speed in the high-transfer-speed path will be explained. The high-transfer-speed path has three levels of transferring speed in high speed range: The first level is applied during the sheet cutting operation as shown in FIG. 5-1, and the speed in this embodiment is 80 mm/s; the second level is applied during the exposing operation as shown in FIG. 5-2, and the speed is controlled in the range of 80 to 100 mm/s based on the kind of the photosensitive sheet to be processed; and the third level is for transporting the photosensitive sheet already exposed as shown in FIGS. 5-3 and 5-4, and the speed is set at a high level of approximately 156 mm/s. Adding to these levels in the high speed range, the high-transfer-speed path according to the present invention is designed so that the path can be driven at a speed in a low level the same as in the low-transfer-speed path. That is, as shown in FIG. 5-4, the movement quantity of the photosensitive sheets passing through the guide part 10 at a high speed is detected by the sensor S2. When the quantity reaches a predetermined value, both high- and low-transfer-speed paths are driven at a low speed of the low-transfer-speed path in order to smoothly transport the sheet from the high-transfer-speed path into the low-transfer-speed path. For instance as shown in FIG. 3, the low level speed in the high-transfer-speed path is adjusted so that the speed is 7.0 mm/s for the photographic paper, and 5.8 mm/s for the OHP films.

FIG. 6 shows the driving unit of the high-transfer-speed path; FIG. 6-1 is a drawing of the unit viewed from the front of FIG. 1; FIG. 6-3 shows the drawing viewed from the other side; the gear arrangement shown in FIG. 6-1 is for transmission at a high speed and the arrangement shown in FIG. 6-2 is for transmission at a low speed. In FIGS. 6-1 to 6-3, M2 is a motor for driving the high-transfer-speed path, a DC motor is used in this embodiment, and the speed of the motor is variable; G201, G202, G203, and G204 are reduction gears, respectively; MC2 and MC3 are electromagnetic clutches used for obtaining a predetermined reduction ratio by changing the above gear arrangement. When the high-transfer-speed path is driven at a speed in the high speed range, the transmission system of M2-MC2-G201-G204 is selected and the three levels above described are obtained by controlling the speed of the motor. When the high-transfer-speed path is operated at a speed in the low speed range, the transmission system of M2-MC2-G202-G203-MC3-G204 is selected, in addition, the speed of the motor is controlled based on the kind of the photosensitive sheets to be processed.

The driving force transmitted to G204 is transmitted to the driving shafts R206 and R205 by the belt and rotates the rollers 102 and 103, respectively. The driving force transmitted to R206 is further transferred to R212 via R211 coaxial to R206, and rotates the roller 104. The driving force transmitted to R205 is further transferred to R210 and MC1 via R209 coaxial to R205. The driving force transmitted to R210 rotates the roller 105. Since the MC1 is a electromagnetic clutch, driving force transmitted to the MC1 rotates the roller 101 only during a predetermined duration.

Figure 7:
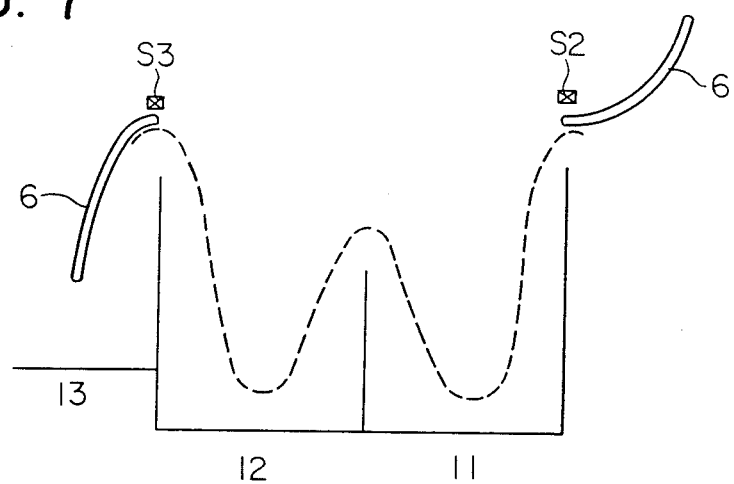

Control of the low- and high-transfer-speed paths when different kinds of photosensitive sheets are stored will further explained below. FIG. 7 is an enlarged drawing of the color developing tank shown in FIG. 1. In FIG. 7, when a photosensitive sheet 6 is transferred form the high-transfer-speed path, a sensor, for instance the sensor S2, detects the front edge or leading edge of the photosensitive sheet 6, issues a signal informing of passing start, and detects the back edge or trailing edge, then issues a signal informing of passing end. When the photosensitive sheet passes through the color developing tank and reaches the sensor S3, the sensor S3 issues the signals informing of the passing start and end in the same manner as the sensor S2. Assuming that the passing start signal issued from the sensor S2 is used as a signal informing of color-developing process start, and the passing end signal issued from the sensor S3 is used as a signal informing of color-developing process completion, time required for the color developing process is calculated as follows:

---

Required processing time t = (840 + 420)/7 = 180/s
where transferred distance from S2 to S3: 840 mm
length of photosensitive sheet: 420 mm (A3 specified in JIS)
kind of photosensitive sheet: photographic paper
(transferred speed 7mm/s)

That is, when 180 seconds passes after the sensor S2 detects the front edge of the photosensitive sheet, the color developing process of the photosensitive sheet being detected is completed.

In the above described embodiment, the sensor detects the front edge of the photosensitive sheet and issues a signal, however, the present invention is not limited to this configuration. For instance, it is possible to take the difference in height of the sensor and solution level and issue signals prior or posterior to the period of time corresponding to the difference.

Next, time required for exposing the photosensitive sheet (that is, the duration from time when the START button is pressed to time when the photosensitive sheet is exposed and reaches the sensor S2) will be explained. The transferring distance in the high-transfer-speed path is designed as a predetermined value shown in FIG. 4, and the transfer speed is set as described in the explanation of FIG. 5. Therefore, the time required for exposing a photosensitive sheet is calculated in the same manner as described above. The required time varies slightly depending on the kind of photosensitive sheet to be exposed. In this embodiment, the time is approximately 15 sec. If the time required for the exposing operation should be assumed as 10 sec., it is possible to start the next exposing operation when 170 sec. has elapsed after the sensor S2 detects the front edge of the photosensitive sheet by shortening the time required for the color-developing operation described above by 10 sec. The speed selecting operation in the low-transfer-speed path when different kinds of photosensitive sheets are stored is executed at the time when the newly fed photosensitive sheet is exposed under the conditions based on the kind and reaches the sensor S2. That is, the sensor S2 issues a signal informing that the next exposing operation is enabled 170 sec. after the sensor detects the front edge of the photosensitive sheet previously processed. At this time, the processing speed in the low-transfer-speed path is maintained at the original one selected for the photosensitive sheet previously being processed until the sensor S2 detects that the next photosensitive sheets proceeds into the low-transfer-speed path. By this function, the next exposing operation is permitted while the preceding photosensitive sheet is in the color developing operation, and the preceding photosensitive sheet is completed the developing process under the conditions selected based on the kind while the next photosensitive sheet is being exposed. When the next photosensitive sheet is completed the exposing operation, the processing speed in the low-transfer-speed path is selected based on the kind of the next photosensitive sheet.

As described above, in the apparatus according to the present invention, while the same kind of photosensitive sheets are processed, the next exposing operation can be started at the time when the preceding photosensitive sheet is exposed, transferred into the low-transfer-speed path, and the sensor S2 detects the sheet. Therefore, consecutive processing is permitted as shown in FIG. 8, wherein a plurality of photosensitive sheets are continuously processed in the color developing tank. When a different kind of photosensitive sheet is installed in this status, the control will described below.

In the case when the apparatus executes the consecutive processing operation as shown in FIG. 8, it is preferable to monitor the movement of the photosensitive sheets using a microcomputer.

FIG. 9 shows an example where a microcomputer is used. In this figure, 301 is a copy operation panel, from which the number of copies to be processed, copy size, or copy operation start signal is inputted, on the contrary, on which the kind of the photosensitive sheets or causes of problems are outputted and displayed; 302 is a discriminator, which detects the kind of the photosensitive sheets and issues detection signals; and 303 are sensors S1 through S7 installed in the processing tanks, which monitor the movement of photosensitive sheets. The signals issued from the above devices are inputted into a bus 306 via an I/O port if necessary and stored into the addresses in a memory 304 designated by a CPU 310.

Further, the timer table used in the present invention will be described below.

The sequential information, photosensitive sheet information, and time information of respective photosensitive sheet to be copied are inputted into the memory 304. The sequential information is for discriminating a plurality of photosensitive sheets, and the sequential order codes are automatically assigned in the processing order. Into the photosensitive sheet information, the length of sheet adjusted and cut at the copy size and the kind code detected by the discriminator are inputted. The time information expresses the integration value of the clock count transferred from the CPU. For instance, assuming that the counting starts from the time when the sensor S2 detects the front edge of the photosensitive sheet, the integration value means the processing time in the color developing tank. If the integration value is larger than the predetermined processing time in the color developing tank at this point, it is determined that any problem such as jamming occurs.

Since a plurality of photosensitive sheets are processed in the same processing tank as shown in FIG. 8, a predetermined number of bits are assigned and prepared for a timer table as shown in FIG. 10 for the respective processing tank in the memory 304 in this embodiment. If a photosensitive sheet is transferred into the processing tank, the sensor detects the photosensitive sheet entering the tank and data regarding the processing order and sheet information are inputted into the timer table and the integration time is entered in the timer aera shown in FIG. 10. Thus, the transfer and processing time of each photosensitive sheet are monitored, respectively. If a different kind of photosensitive sheets is mounted, the processing operation is controlled according to the flow chart shown in FIG. 11 when a microcomputer monitors the movement of each photosensitive sheet as described above.

Figure 11:
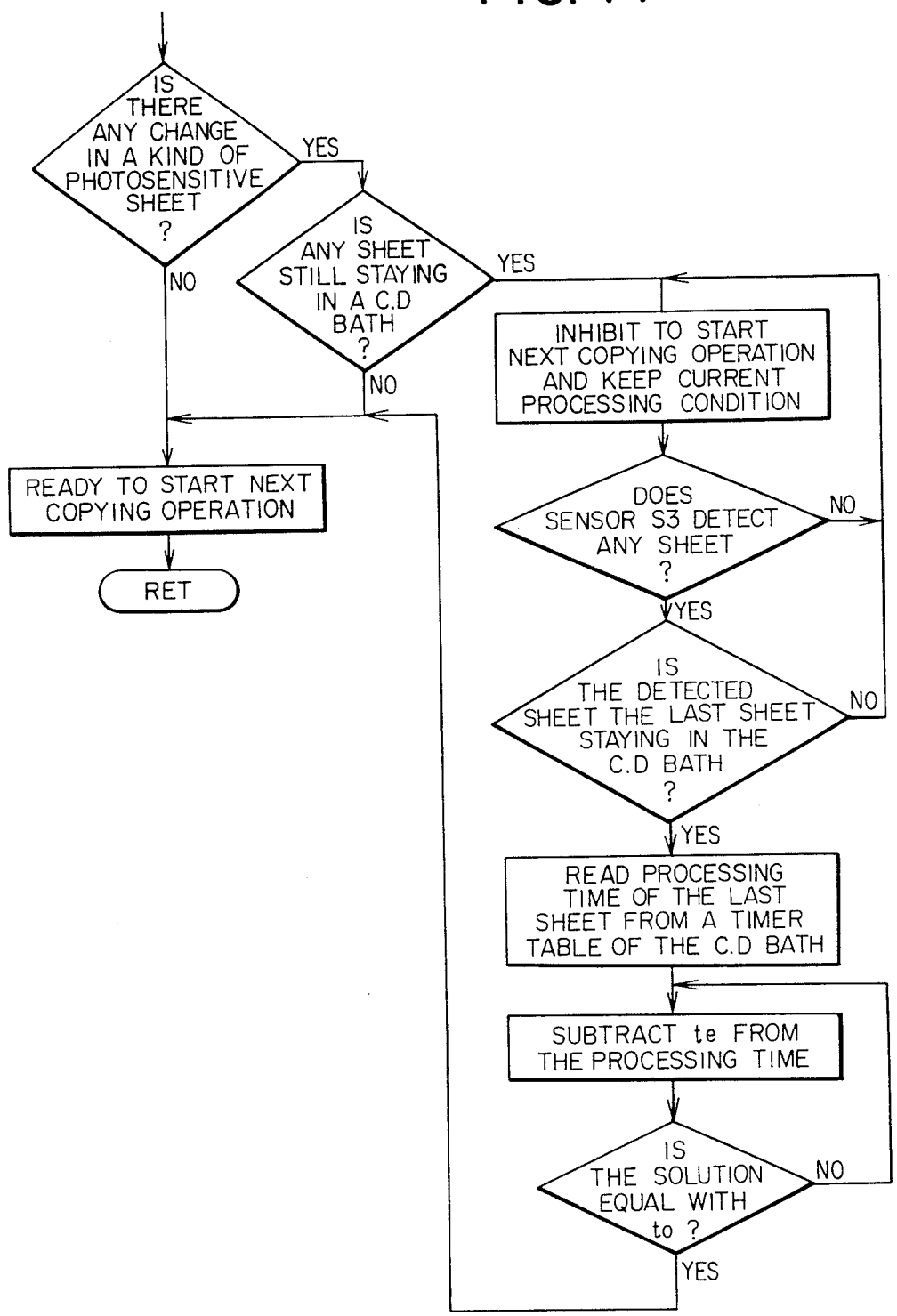
FIG. 11 is another example of the process flow chart.

Functions of the flow chart shown in FIG. 11 is basically identical with those of the flow chart shown in FIG. 2, however, the completion of the processing operation is determined by the following procedures. Since a plurality of photosensitive sheets are consecutively processed as shown in FIG. 8, jamming in the processing tanks are monitored using the timer table and the sensor S3. At the same time, the movement of the last photosensitive sheet in the color developing tank is monitored, and the processing time t of the last photosensitive sheet is read from the timer table. At this point, the kind of the photosensitive sheet to be processed and the copy size is entered from the copy operation panel are also read from the timer table. On the basis of these data, the exposing time $t_e$ for the photosensitive sheet is read from the memory 304 prepared in advance. Then, the exposing time $t_e$ is subtracted from the processing time t, wherein the processing completion time $t_o$, which is obtained by subtracting the time required for exposing operation from the processing time (from the time when the front edge of the photosensitive sheet is detected by the sensor S2 to the time when the back edge of the sheet is detected by the sensor S3), have been obtained for various combinations of the kinds and sizes of photosensitive sheets in advance and are prepared in the memory 304. Next, the processing completion time $t_o$ is read and compared with the solution of the subtraction above. When both values equal each other, it is regarded that the processing operation of the last photosensitive sheet currently processed in the color developing tank has been completed, allowing the next copying operation to be enabled. The operation speed in the low-transfer-speed path is maintained at a value selected based on the kind of the photosensitive sheet being processed until the exposing operation of the next photosensitive sheet is completed and the sheet is detected by the sensor S2. During this period, the last photosensitive sheet being processed in the color developing tank passes through the color developing tank. After the sensor S2 detects the newly exposed photosensitive sheet, the speed of the low-transfer-speed path is selected based on the kind of the new photosensitive sheet.

As described above, by monitoring the movement of each photosensitive sheet using the timer table, problems such as jamming can be detected earlier. At the same time, the copying efficiency can be finely improved based on the kinds and sizes of the photosensitive sheets as shown in this embodiment.

What is claimed is:

1. In an image forming apparatus for forming an image on a plurality of different types of photosensitive and materials by subjecting said photosensitive materials to an image forming processing including image wise exposing, developing, and fixing, wherein processing conditions are determined dependent upon the type of photosensitive material being processed, the improvement comprising;
   a kind-discriminating means for discriminating the type of photosensitive material in said apparatus,
   a process-monitoring means for monitoring the progress of the image forming process,
   judging means for changing the processing conditions when a new type of photosensitive material is detected by said kind-discriminating means, and controlling the processing operations in accordance with an output of said processing-monitoring means, and,
   a delay means to delay the change in processing conditions so that, when a new type of photosensitive material, different from a current type of photosensitive material being subjected to a current image process is detected by said kind-discriminating means, said change in processing conditions does not affect the processing of said current type of photosensitive material, said delay being determined by the progress of said current type of photosensitive material monitored by said process-monitoring means,
   wherein said delay is terminated immediately upon the complete entrance of said current type of photosensitive material into a first constant stage of said image forming process, said first constant stage and all subsequent stages being stages in which processing conditions do not vary.

2. The image forming apparatus of claim 1,
   wherein said image forming apparatus comprises an image wise exposing part, a developing tank, a fixing tank and a conveying means for transferring the photosensitive material,
   wherein said process-monitoring means comprises at least one sensor for detecting a movement of the photosensitive material and said sensor is so disposed as to detected the completion of developing process for the photosensitive material, and
   wherein said judging means allows the new image forming process for the new kind after receiving the completion signal of developing process from the process-monitoring means.

3. The image forming apparatus of claim 2,
   wherein, in the case of allowing the new image forming process, said judging means changes a transfer speed of said conveying means in accordance with the new kind.

4. The image forming apparatus of claim 1,
   wherein said image forming apparatus comprises an imagewise exposing part, a developing tank, a fixing tank and a conveying means for transferring the photosensitive material,
   wherein said process-monitoring means comprises at least one sensor for detecting the movement of the photosensitive material and said sensor is so disposed as to detect the commencement of developing process for the photosensitive material, and
   wherein said judging means allows the new image forming process for the new kind after the elapse of a predetermined time period from the commencement of developing process.

5. The image forming apparatus of claim 4,
   wherein said conveying means has at least two speed groups of which the first is applied to said imagewise exposing part and the second is applied to the developing tank and the fixing tank, a transfer speed of the two speed groups are changed respectively in accordance with a kind of photosensitive material,
   wherein, in the case of allowing the new image forming process, said judging means changes the transfer speed of said first speed group in accordance with the new kind.

6. The image forming apparatus of claim 5,
   wherein said judging means changes the transfer speed of the second speed group in accordance with the new kind after receiving the commencement signal of the developing process for the new kind.

7. The apparatus of claim 1 wherein said juding means changes the exposure.

8. The apparatus of claim 7 wherein said juding means changes the developing conditions for the new kind of photosensitive material after said processing means detects the completion of color development of said current type of photosensitive material.

9. The apparatus of claim 7 wherein said new type of photosensitive material is subjected to imagewise exposing a predetermined period time prior to the completion of the color development of said current type of photosensitive material.

10. The apparatus of claim 9 wherein said predetermined period of time is a period of time necessary to imagewise expose said new type of photosensitive material.

11. The apparatus of claim 1 wherein said judging means allows said new type of photosensitive material to the imagewise exposed after said process-monitoring means detects the completion of color development of said current type of photosensitive material.

12. The apparatus of claim 10 wherein said judging means changes the developing conditions for said new kind of photosensitive material after said process-monitoring means detects the completion of color development of said current type of photosensitive material.

* * * * *